United States Patent
Takeuchi et al.

(10) Patent No.: US 6,299,928 B1
(45) Date of Patent: Oct. 9, 2001

(54) FINE GRANULAR FEEDS FOR FRY

(75) Inventors: Toshio Takeuchi; Hirotoshi Hayasawa; Tsutomu Kudo; Hiroshi Miyakawa; Akio Yamada; Naomichi Okuma; Waichi Ishizuka; Shuzo Ishida, all of Kanagawa (JP)

(73) Assignees: Morinaga Milk Industry Co., Ltd., Tokyo; Taiyo Yushi K.K., Yokohama, both of (JP)

(*) Notice: Subject to any disclaimer, the term of this patent is extended or adjusted under 35 U.S.C. 154(b) by 0 days.

(21) Appl. No.: 09/623,503

(22) PCT Filed: Mar. 17, 1999

(86) PCT No.: PCT/JP99/01321

§ 371 Date: Sep. 19, 2000

§ 102(e) Date: Sep. 19, 2000

(87) PCT Pub. No.: WO99/47002

PCT Pub. Date: Sep. 23, 1999

(30) Foreign Application Priority Data

Mar. 19, 1998 (JP) .................................... 10-090893

(51) Int. Cl.⁷ ........................................ A23J 3/00
(52) U.S. Cl. ..................... 426/656; 426/658; 426/805
(58) Field of Search .................... 426/656, 658, 426/805

(56) References Cited

U.S. PATENT DOCUMENTS 4,212,890 * 7/1980 Tiefenbacher et al. ............... 426/69
5,773,051 * 6/1998 Kim .......................................... 426/1

FOREIGN PATENT DOCUMENTS

| 0292052 | * | 11/1988 | (EP) . |
| 0399555 | * | 11/1990 | (EP) . |
| 55081552 | * | 6/1980 | (JP) . |
| 02215327 | * | 8/1990 | (JP) . |
| 06062760 | * | 3/1994 | (JP) . |
| 06062765 | * | 3/1994 | (JP) . |
| 08275735 | * | 10/1996 | (JP) . |

* cited by examiner

Primary Examiner—Chhaya D. Sayala
(74) Attorney, Agent, or Firm—Oblon, Spivak, McClelland, Maier & Neustadt, P.C.

(57) ABSTRACT

Fine granular feeds for fry of fishes and shellfishes capable of remarkably elevating the survival rate of fry, improving the cultivation efficiency, and causing little elution of nitrogen sources therefrom into seawater or water in feeding, which are characterized by containing at least three active components, i.e., (a) a long-chain unsaturated fatty acid calcium salt blend comprising 80% by weight or more of long-chain unsaturated fatty acid calcium salt(s) having at least 18 carbon atoms, (b) 20% by weight or less of a browned matter formed by heating molasses or saccharides, a browned matter formed by heating saccharides with amino acids or a mixture thereof at an arbitrary ratio, and (c) a mixture of peptides obtained by hydrolyzing animal protein, and being in the form of fine grains.

3 Claims, No Drawings

FINE GRANULAR FEEDS FOR FRY

TECHNICAL FIELD

The present invention relates to fine granular feeds for fry that provide a remarkably increased survival rate for cultured fry, such as red sea bream, flounder, shrimp, and the like. More particularly, the invention is fine granular feeds for fry in the form of fine granules, containing at least two effective ingredients, i.e., a) a long-chain unsaturated fatty acid calcium salt blend comprising 80% (by weight) or more of long-chain unsaturated fatty acid calcium salt(s) having at least 18-carbon atoms and 20% (by weight) or less of a browned matter formed by heating molasses or sugars, a browned matter formed by heating sugars and amino acids, or a mixture thereof in an arbitrary ratio, and (b) a mixture of peptides obtained by hydrolyzing animal protein.

As used herein, a long-chain unsaturated fatty acids refers to unsaturated fatty acids having at least 18 carbon atoms, and percentages are expressed by weight, except for the survival rate.

BACKGROUND ART

Mortality of cultured fry is a significant business problem for the aquaculture industry, and there is an urgent need to increase the fry survival rate (the number of live fry as a percentage of total cultured fry).

Rotifera, brine shrimp, and other live organisms are widely used as feed in conventional fish and shellfish farms, but diversification of the types of conventional fish and shellfish being raised and dramatic increases in production have led to supplemental use of artificially prepared fine granular feeds (hereinafter referred to simply as fine granular feeds). While it is known that ingestion, digestion, and absorption of fine granular feeds are inferior to live organisms (Kagaku to Seibutsu, Vol. 29, No. 9, pages 571–580, 1991; Nippon Saibai Gyogyo Kyokai, "Saibai Gyogyo Gijutsu Kenshu Kiso Riron Koosu Tekisuto: Shiryo Seibutsu Shiriizu No. 9," Nippon Saibai Gyogyo Kyokai, 1988), fine granular feeds have a number of advantages since nutrient preparation and regulation of granule size are easy and reductions in labor, equipment, and outlays associated with feed can be reduced, and in fish farms, if fine granular feeds can be provided early on, there is a significant effect on productivity.

Fry typically have extremely short vitelline stage, so the gastric gland is still undeveloped at the outset of the ingestion stage, and it has been reported that during the period extending from hatching to the young fish stage, during which fry are incapable of digesting feed, digestive enzyme activity is extremely low (Nippon Saibai Gyogyo Kyokai, "Saibai Gyogyo Gijutsu Kenshu Kiso Riron Koosu Tekisuto: Shiryo Seibutsu Shiriizu No. 9," Nippon Saibai Gyogyo Kyokai, 1988; Journal of Fish Biology, Vol. 30, pages 15–33, 1987; and Comparative Biochemistry and Physiology, Vol. 95B, No. 4, pages 647–652, 1990).

While the fat and carbohydrate digestion mechanism and the absorption mechanism in the fry stage do not differ appreciably from those in a mature fish, it is reported that there is a significant difference in protein digestion (Nippon Suisan Gakkai Shi, Vol. 38, pages 1143–1152, 1972; and Bulletin of Japanese Society of Scientific Fisheries, Vol. 39, No. 8, pages 77–88, 1973).

In the fry stage, in which the gastric gland is still undeveloped, protein in live feed (water-soluble nitrogen content is 53–74%) is typically decomposed by a trypsin-like enzyme secreted in the intestinal tract, and is absorbed by rectal epithelial cells. On the other hand, it is reported that once the gastric gland has developed, digestion and absorption of fine granular feed is accomplished through decomposition by gastric pepsin (Bulletin of Japanese Society of Scientific Fisheries, Vol. 39, No. 8, pages 77–88, 1973; Nippon Saibai Gyogyo Kyokai, "Saibai Gyogyo Gijutsu Kenshu Kiso Riron Koosu Tekisuto: Shichigyoki no Hatsuiku Shiriizu No. 1" Nippon Saibai Gyogyo Kyokai, 1991; and Suisan no Kenkyu, Vol. 6, No. 4 pages 108–111, 1987).

In order for proteins to be digested within cells, the proteins must be ingested by cells through pinocytosis, but since the distance between intestinal villi is on the order of several ten $\mu$m, feed protein granules are not readily absorbed in the intestine. On the other hand, it has been reported that water-soluble protein and peptides can be absorbed in the intestines of fish ("Nippon Saibai Gyogyo Kyokai, Shiryo Seibutsu Shiriizu No. 10," Nippon Saibai Gyogyo Kyokai, 1988; and Journal of Nutrition, Vol. 127, No. 4, pages 608–614, 1997).

Fry feeds are being developed on the basis of past discoveries, examples being an animal growth promoting feed additive consisting of saturated or unsaturated fatty acid salts having at least 6–24 carbon atoms (Japanese Laid-Open Patent Publication No. 58-47442/1983); a fish feed containing from 0.1 to 20% of a iso fatty acid or salt thereof having 4–5 carbon atoms (Japanese Laid-Open Patent Publication No. 3-240447/1991); feed pellets consisting of a base having fish meal, etc. as its principal ingredient and containing vitamins and other effective ingredients to be readily pyrolyzed, to which are added fatty acids and/or salts thereof having 16–18 carbon atoms and a small quantity of water, followed by compounding, granulation, and brief low-temperature drying (Japanese Laid-Open Patent Publication No. 7-99895/1995); a feed for farmed flounder containing from 1 to 30 parts by weight of hydrolyzed vegetable protein per 100 parts by weight of the food (Japanese Laid-Open Patent Publication No. 7-227223/1995); a feed for farmed shrimp containing hydrolyzed vegetable protein (Japanese Laid-Open Patent Publication No. 8-51937/1996); fish food pellets containing higher fats and oils molded in the presence of from 5 to 15% fatty acid calcium salts (Japanese Laid-Open Patent Publication No. 8-317761/1996), etc.

Also known are Maillard type browned matter produced by heating sugars and amino acids, and caramel type browned matter produced by heating sugars (e.g., Nippon Nogei Kagaku Kai Shi, Vol. 43, No. 7, page 484, 1969; Journal of Food Science, Vol. 40, No. 3, page 460, 1975; Chemical Abstracts, Vol. 98, Article No. 33211W, 1983). Also known is the use in a feed of a ratio of 1:1 (by weight) of ethylene diamine dihydroidodide and a mixture of caramel, hemicellulose, xylose, and lignosulfate, with the ethylene diamine dihydroidodide serving as a stabilizer during storage (U.S. Pat. No. 3,733,405/1973).

Apart from the prior art cited above, the Applicants previously obtained a patent disclosing inclusion of long-chain unsaturated fatty acid calcium salts and browned matter in poultry feed in order to extend the ovipositional period in poultry, as well as improve the oviposition rate, reduce the rate of egg rupture, and enhance linolic acid, linolenic acid, and other long-chain unsaturated fatty acids in the yolk (Japanese Patent No. 2,077,881, hereinafter denoted as "patented invention.").

There are disclosed in the prior art techniques using either fatty acid calcium salts or hydrolyzed vegetable protein as fish food or fry food. In contrast to the aforementioned fatty acid calcium salts, however, the concomitant use of the long-chain unsaturated fatty acid calcium salt blend of the patented invention (consisting of browned matter and long-chain unsaturated fatty acid calcium salts) with a peptide mixture that is hydrolyzed animal protein (hereinafter denoted as "animal peptide mixture") as a fine granular feed for fry is not known.

With the foregoing in view, the inventors conducted diligent research concerning a feed that would increase the survival rate of fry, as a result of which they discovered that fine granular feeds having as principal ingredients the long-chain unsaturated fatty acid calcium salt blend and animal peptide mixture of the patented-invention, and containing admixed therein other nutrients needed for fry, remarkably increase the survival rate of fry, and produce negligible elution of nitrogen sources into seawater or water from the fine granular feeds, and thus perfected the invention.

SUMMARY OF THE INVENTION

The present invention provides fine granular feeds for fry that remarkably increase the survival rate of fry, improve the efficiency of culture, and produce negligible elution of nitrogen sources into seawater or water from the fine granular feeds.

The present invention relates to fine granular feeds for fry in the form of fine granules, containing at least two effective ingredients, a) a long-chain unsaturated fatty acid calcium salt blend comprising 80% (by weight) or more of long-chain unsaturated fatty acid calcium salt(s) having at least 18 carbon atoms and 20% (by weight) or less of a browned matter formed by heating molasses or sugars, a browned matter formed by heating sugars and amino acids, or a mixture thereof in an arbitrary ratio, and (b) a mixture of peptides obtained by hydrolyzing animal protein.

According to the present invention, the survival rate of fry can be remarkably increased, improved efficiency of culture is possible, the economic advantages thereof are significant, and elution of nitrogen sources into seawater or water from the fine granular feeds is negligible, so that feeding efficiency is high, making possible reductions in the labor, equipment, and outlays entailed in farming fry.

DETAILED DISCLOSURE OF THE INVENTION

It is an object of the present invention to provide fine granular feeds for fry that remarkably increase the survival rate of fry, improve the efficiency of culture, and produce negligible elution of nitrogen sources into seawater or water from the fine granular feeds.

To achieve the stated object, the invention is fine granular feeds for fry that contain at least two effective ingredients, a) and b), of fine granular form:
   a) a long-chain unsaturated fatty acid calcium salt blend comprising 80% (by weight) or more of long-chain unsaturated fatty acid calcium salt(s) having at least 18 carbon atoms and 20% (by weight) or less of a browned matter formed by heating molasses or sugars, a browned matter formed by heating sugars and amino acids, or a mixture thereof in an arbitrary ratio, and
   (b) a mixture of peptides obtained by hydrolyzing animal protein.

In preferred practice, in the invention, the long-chain unsaturated fatty acid calcium salt blend will be 80 to 99.5% (by weight) of long-chain unsaturated fatty acid calcium salt(s) having at least 18 carbon atoms and 20 to 0.5% (by weight) of a browned matter formed by heating molasses or sugars, a browned matter formed by heating sugars and amino acids, or a mixture thereof in an arbitrary ratio; and the long-chain unsaturated fatty acid calcium salt blend and peptide mixture will be contained in amounts of 20 to 50% (by weight) and 80 to 50% (by weight), respectively, based on ingredients excluding the other feed ingredients.

Next, the invention is described in greater detail.

The fine granular feeds for fry of the invention are described in greater detail, first describing the manufacturing process therefor.

1) Manufacture of long-chain unsaturated fatty acid calcium salt blend

Long-chain unsaturated fatty acid calcium salt blend for use in the fine granular feeds for fry of the invention is manufactured, for example, in the following manner, as disclosed in the specification of the patented invention.

a. Manufacture of long-chain unsaturated fatty acid calcium salts

The long-chain unsaturated fatty acid calcium salts are manufactured by known methods, for example, in the following manner by methods such as the double decomposition method (Yoshida Tokiyuki et al, ed., "Kinzoku Sekken no Seishitsu to Oyo," page 15, Koshobo, 1988), etc.

A fat or oil having long-chain unsaturated fatty acids as its principal constituent fatty acids and having an iodine value of 50 or above, such as linseed oil, soybean oil, corn oil, fish oil, etc., or a mixture of such oils and fats, is saponified to give a fatty acid alkali soap, to which is added an aqueous solution of a calcium salt that is reacted with the soap, whereupon the resultant fatty acid calcium salt (this fatty acid calcium salt is the long-chain unsaturated fatty acid calcium salt in the invention) is separated, washed, dewatered, and dried to give a long-chain unsaturated fatty acid calcium salt of powder form. In this manufacturing process, prior to the reaction, a predetermined amount of a browned matter formed by heating molasses or sugars, a browned matter formed by heating sugars and amino acids, or a mixture thereof in an arbitrary ratio (hereinbelow referred to collectively as "browned matter") is mixed with the fat or oil, and the fatty acid calcium salt reaction is then carried out.

b. Manufacture of browned matter

An example method for manufacture of browned matter is as follows. The molasses or sugars used as the starting material for browned matter manufacture are commercially available products, and the browned matter produced by heating thereof can be manufactured by subjecting molasses or sugars (for example, glucose, lactose, etc.) to heating at normal pressure (for example, 2 to 6 hours at 100° C.) using known methods. The resultant browned matter has a brown color; caramel is an example of commercially available products. The browned matter produced by heating sugars and amino acids can be a commercially available product or one manufactured by subjecting monosaccharides and amino acids to heating at normal pressure using known methods. Mixtures of these two types of browned matter in arbitrary ratios may be used in the invention as well.

c. Manufacture of long-chain unsaturated fatty acid calcium salt blend

An example method for manufacture of the long-chain unsaturated fatty acid calcium salt blend is as follows. A predetermined amount of the browned matter is added to the long-chain unsaturated fatty acid calcium salt powder described earlier, and evenly mixed using a mixer or the like. In the process of manufacturing the long-chain unsaturated fatty acid calcium salts, it is possible to add a predetermined amount of browned matter prior to the reaction, and when subsequently carrying out the reaction, adding browned matter in the preceding manner only if browned matter content has not reached the predetermined amount, In either case, the added proportion of browned matter is 20% or less, and preferably 0.5 to 10%, as disclosed in the specification of the patented invention. The long-chain unsaturated fatty acid calcium salt blend is obtained by the manufacturing method described above.

2) Manufacture of animal peptide mixture

The animal peptide mixture which constitutes the other principal ingredient of the fine granular feeds for fry of the invention may be manufactured by the following method, for example.

Starting materials for manufacturing the animal peptide mixture include casein (e.g., casein lactate, casein hydrochloride, sodium caseinate, potassium caseinate, mixtures thereof, etc.), whey protein, whey protein condensate (WPC), whey protein isolate (WPI), egg white, fish and shellfish-derived protein, livestock-derived protein, and mixtures of these proteins in arbitrary ratios (hereinafter termed collectively "animal protein"), and the like, either commercially available products or those prepared using ordinary methods known in the art.

The animal protein is dispersed or dissolved in water or hot water. The concentration of the dispersion or solution is not critical, but typically preparation within a range of concentration of about 5 to 15%, expressed as protein concentration, is preferred from the standpoints of dissolving efficiency and operability.

One or a combination of two or more proteolytic enzymes can be added to the dispersion or solution in order to hydrolyze the animal protein. Examples of proteolytic enzymes which may be used are BIOPRASE (ex Nagase Seikagaku Kogyo), AMANO A (ex Amano Seiyaku), PANCREATIN (ex Amano Seiyaku), PROREZER (ex Amano Seiyaku), PROTEASE S (ex Amano Seiyaku), SAVINASE (ex Novo Nordisk), GODO B.A.P (ex Godo Shusei), PROTEASE N (ex Amano Seiyaku), GODO B.N.P (ex Godo Shusei), NEUTRASE (ex Novo Nordisk), ALCALASE (ex Novo Nordisk), TRYPSIN (ex Novo Nordisk), CHYMOTRYPSIN (ex Novo Nordisk), SUBTILISIN (ex Novo Nordisk), PAPAIN (ex Amano Seiyaku), BROMELAIN (ex Amano Seiyaku), and other commercially available products. Where a plurality of proteolytic enzymes are used, these may be added simultaneously or sequentially to the dispersion or solution.

The amounts in which proteolytic enzymes are used versus the animal protein will depend on substrate concentration, enzyme titer, reaction temperature, and reaction time, but typically range from about 100 to 10,000 units of activity per 1 g of protein contained in the animal protein dispersion or solution.

In preferred practice, pH during the hydrolysis reaction will be adjusted to within a range that includes the optimal pH for the enzyme being used. Specifically, in preferred practice, before adding the enzyme to the animal protein dispersion or solution, pH will adjusted to within a range that includes the optimal pH for the enzyme being used, and pH will then be maintained within a range that includes the optimal pH for the enzyme being used while carrying out hydrolysis. Typically, pH during the hydrolysis reaction drops after the enzyme is added and as the hydrolysis reaction proceeds, so in preferred practice an aqueous solution of an alkali agent will be added prior to adding the enzyme, to bring pH to 8 or above. Alkali agents that can be used for this purpose include sodium hydroxide, potassium hydroxide, potassium carbonate, and the like.

The temperature for the hydrolysis reaction is not critical, and may be selected from within a practical range that includes the suitable temperature range for expression of enzyme activity, typically 30 to 70° C. ; microbial proliferation during the hydrolysis reaction can be inhibited by maintaining the temperature within the range of 50 to 60 ° C.

As for the duration of the hydrolysis reaction, since the reaction proceeds differently depending on reaction parameters such as the type and combination of enzyme(s) used, reaction temperature, initial pH, and soon, using the same given reaction time for the enzyme reaction creates the possibility that decomposition products having different physicochemical qualities may be produced in different manufacturing batches, so no single rule can be specified. In preferred practice, therefore, the enzyme reaction will be monitored over time to determine optimal reaction time.

The hydrolysis reaction is carried out in the preceding manner; preferred parameters for the hydrolysis reaction are a reaction temperature of 30 to 60° C., reaction time of from 5 to 24 hours, enzyme added amount of 100 to 10,000 units of activity per 1 g of protein, and so on. The enzyme reaction may be terminated by heating the reaction solution (for 15 minutes at 85° C., for example) to deactivate the enzyme.

Where insolubles form during the hydrolysis reaction and/or enzyme heat deactivation, these are filtered out.

Filtering of insolubles may be accomplished by microfiltration and/or ultrafiltration, diatomaceous earth and/or ultrafiltration, and so on. The resultant solution containing the animal peptide mixture is condensed using known methods and the condensate is dried using known methods to produce an animal peptide mixture of powder form.

3) Manufacture of fine granular feed for fry

An example of a method for the manufacture of fine granular feed for fry of the invention follows. A predetermined amount of the animal peptide mixture of powder form is dissolved in a 3- to 4-fold quantity (by weight) of water, placed in a heated mixer (a tabletop kneader (ex Irie Shokai), for example), and heated to 80–85 ° C. A predetermined amount of the long-chain unsaturated fatty acid calcium salt blend powder is added, stirred for about one hour at 85–90° C., and predetermined amounts of other ingredients are added, stirring for 30 minutes at the same temperature to mix evenly. Next, the product is heated to 90–95° C., a partial vacuum is created in the mixer, and the product is dewatered with stirring to give a granular solid. By reducing the water content of the mixture (feed mixture), the mixture assumes a highly viscous paste form, and when water content falls below about 5% it assumes the form of a granular solid, which is then milled to give fine granules. The resultant granular mixture is classified to the desired size to give a fine granular feed.

As will become apparent from the test examples given later, the long-chain unsaturated fatty acid calcium salt blend and animal peptide mixture contents of the fine granular feed for fry (here and subsequently refers to long-chain unsaturated fatty acid calcium salt blend and animal peptide mixture contents net of other feed ingredients) are 20 to 50% and 80 to 50% respectively, and preferably 30 to 50% and 70 to 50% respectively. Conversion of these values to a total feed ingredients basis gives the following. Where other feed ingredients constitute 10%, for example, long-chain unsaturated fatty acid calcium salt blend and animal peptide mixture contents are 18 to 45% and 72 to 45% respectively.

Fine granular feed particle size can be selected as appropriate within the range 5 to 250 μm, depending on the type of fry being fed, the number of days since hatching, and other factors. For flounder, red sea bream, yellowjack, and the like, particle size is adjusted to from 120 to 180 μm for 2 to 10 days after hatching, and to 180 to 210 μm for from 11 days on.

Examples of additional feed ingredients are soybean lecithin, soybean lecithin fractions, amino acids, taurine, vitamin blends, choline chloride, mineral blends, and the like. These ingredients may be compounded in the manner described in the later Examples to produce fine granular feeds for fry of the invention.

Raising of fry using the fine granular feeds for fry of the invention may be accomplished by ordinary methods. A specific example follows. A fine granular feed for fry of the invention is suspended to predetermined concentration in seawater or water, and provided to the fry at predetermined time intervals. For example, for 1,000 fry, from 0.5 to 5 g of feed per day is suspended in 500 mL seawater or freshwater, and provided for the rearing of the fry in several doses to several tens of doses from the 2nd to 3rd day after hatching and thereafter.

As will become apparent from the test examples given later, the fine granular feeds for fry of the invention have minimal elution of nitrogen sources from the fine granules into seawater or freshwater and can thus be provided to the fry with high feeding efficiency, affording an appreciably higher fry survival rate, while affording reductions in the labor, equipment, and outlays entailed in farming fry.

The invention is now illustrated in detail through test examples.

Test Example 1

This test was conducted in order to ascertain red sea bream survival rate achieved with the fine granular feeds for fry of the invention.

1) Preparation of Test Material

Using the same method as in Example 1, fine granular feeds for fry of the invention were prepared and used as test feeds. Separately, a feed was prepared by the same method as in Example 1, except for using 430 g of long-chain unsaturated fatty acid calcium salt not containing browned matter, prepared in the same manner as Reference Example 3 except for changing 200 g of caramel (ex Taiyo Yushi) to 200 g of water, and 1,060 g of casein sodium (ex New Zealand Dairy Board) in place of the long-chain unsaturated fatty acid calcium salt blend and hydrolyzed casein in Example 1 to prepare Comparison Feed 1.

Rotifera were raised at a temperature of 25° C. with raw chlorella (NAMA CHLORELLA V12 ex Chlorella Kogyo), adding a nutritional supplement (DHA-38G ex Nippon Kagaku Shiryo) in a concentration of 0.5 g/10 L 20 hours prior to feeding to prepare an S-type Rotifera feed, designated Comparison Feed 2.

2) Test Method

Red sea bream eggs were hatched by the usual method, and the hatched fry were randomly divided into three groups of 500. The test was carried out in the following manner beginning on the second day after hatching, and the survival rate of each group was tracked.

(1) test tank: 100 L round Panlite tank (2) water exchange: running water system (2–3 rotations)

(3) inflow water: filtered seawater (filtered to prevent plankton from entering)

(4) water temperature: adjusted to 20–22° C. by automatic temperature control (5) illumination: 2,000 lux (6) illumination cycle: every 12 hours (illumination from 6 AM to 6 PM)

(7) feeding: the test feed and Comparison Feed 1 in amounts of 0.6 to 3.0 g divided into 6 to 9 doses per day, and for Comparison Feed 2,500,000 Rotifera divided into 3 doses per day, were provided to each group, suspending the feed in seawater.

3) Test results

Results for this test are as shown in Table 1. From Table 1 it will be apparent that the survival rate at 14 days after hatching was 92% for the test feed group, versus 60% for the Comparison Feed 1 group and 98% for the Comparison Feed 2 group, demonstrating that the survival rate for the test feed group was about the same as for the Comparison Feed 2 group, and that the survival rate with the test feed was very high.

The survival rate at 23 days after hatching was 60% for the test feed group, while that for the Comparison Feed 1 group was 35% and that for the Comparison Feed 2 group 90%. While the test feed group had a lower value than the Comparison Feed 2 group, the survival rate was still 1.7 times higher than the Comparison Feed 1 group.

From these results it was confirmed that the test food gave an appreciably superior survival rate than conventional feed.

The test was performed with different types of fine granular feeds for fry; results were about the same.

TABLE 1

| Feed | Survival rate by days after hatching | |
|---|---|---|
| | 14 days | 23 days |
| Test feed | 92 | 60 |
| Comparison Feed 1 | 60 | 35 |
| Comparison Feed 2 | 98 | 90 |

Test Example 2

This test was conducted in order to ascertain the red sea bream survival rate achieved with the fine granular feeds for fry of the invention.

1) Preparation of Test Material

A test feed and a comparison feed were prepared by the same method as in Test Example 1, except for adjusting the particle size of the test feed and the Comparison Feed 1 prepared by the method of Test Example 1 to 120–150 μm.

2) 1,000 flounder eggs were hatched by the usual method, and the hatched flounder fry were randomly divided into two groups of 300. The test was carried out in the following manner beginning on the second day after hatching, and the survival rate of each group was tested on the 25th day after hatching.

(1) test tank: 100 L round Panlite tank (2) water exchange: running water system (2–5 rotations)

(3) inflow water: filtered seawater (filtered to prevent plankton from entering)

(4) water temperature: adjusted to 18–20° C. by automatic temperature control (5) illumination: 500±100 lux (6) illumination cycle: every 12 hours (illumination from 6 AM to 6 PM)

(7) feeding: each feed in amounts of 0.5 to 1.5 g was divided into 10 doses per day given at 1 hour intervals from 8 AM to 5 PM were provided to each group, suspending the feed in seawater.

3) Test Results

The results of the test were a survival rate of 65% for the test feed group, versus 32% for the Comparison Feed group, demonstrating a survival rate increasing effect such that the survival rate in the test feed group was about twice that in the Comparison Feed group.

The test was performed with different types of fine granular feeds for fry; results were about the same.

Test Example 3

This test was conducted in order to ascertain elution of nitrogen sources from fine granular feeds.

1) Preparation of Test Material

Seven types of test feed (particle size 120 to 180 μm in each case) were prepared by the method of Example 2, except for varying the proportions of the long-chain unsaturated fatty acid calcium salt blend and animal peptide mixture as indicated in Table 2.

2) Test Method 30 g of each fine granular feed was dispersed in 1 L of 3% concentration salt water held at 20° C., stirred at a speed of 100 rpm with a stirrer (ex Shinto Kagaku, three-one motor) at the same temperature, and after 90 minutes was filtered with filter paper (ex Toyo Roshi, No. 2) to obtain a filtrate. The nitrogen content of the fine granular feeds prior to addition thereof to the salt water and of the filtrates were measured, and the eluted nitrogen was calculated.

3) Test Results

Test results are indicated in Table 2. It will be apparent from Table 2 that feeds containing the long-chain unsaturated fatty acid calcium salt blend in proportions of less than 20% and the animal peptide mixture in proportions in excess of 80% had undesirably high nitrogen elution.

In contrast, feeds containing the long-chain unsaturated fatty acid calcium salt blend in proportions of from 20 to 50% and the animal peptide mixture in proportions of from 80 to 50% had minimal nitrogen elution, and were surmised to have good feeding efficiency. Feeds containing the long-chain unsaturated fatty acid calcium salt blend in proportions exceeding 50% and the animal peptide mixture in proportions of less than 50% showed no appreciable improvement in nitrogen elution, results being about the same as those for feeds containing the long-chain unsaturated fatty acid calcium salt blend in proportions of from 20 to 50% and the animal peptide mixture in proportions of from 80 to 50%.

The test results demonstrated that where the proportion of the long-chain unsaturated fatty acid calcium salt blend in the fine granular feeds of the invention is from 20 to 50%, and especially from 30 to 50%, and the proportion of animal peptide mixture is from 80 to 50%, and especially from 70 to 50%, nitrogen elution is minimal.

The test was performed with different types of fine granular feeds for fry; results were about the same.

TABLE 2

| long-chain unsaturated fatty acid calcium salt blend (%) | nitrogen animal peptide mixture (%) | elution rate (%) |
| --- | --- | --- |
| 15 | 85 | 35.8 |
| 20 | 80 | 29.7 |
| 25 | 75 | 20.4 |
| 30 | 70 | 16.0 |
| 40 | 60 | 9.4 |
| 50 | 50 | 3.8 |
| 55 | 45 | 3.5 |

Reference Example 1

To 5 kg of linseed oil (ex Taiyo Yushi) was added 0.82 kg of calcium hydroxide (ex Hishiko Sekkai Kogyo) and mixed evenly. To the mixture were added 500 mL of water containing 3.65 g of LIPASE PL-266 (ex Meito Sangyo) dispersed therein, and 200 g of caramel (ex Taiyo Yushi), which were then mixed and stirred for 30 minutes at normal temperature, and left standing for 30 hours to react. The resultant reaction product was milled by ordinary methods, yielding about 6.3 kg of a long-chain unsaturated fatty acid calcium salt blend powder.

Reference Example 2

To 3 kg of cuttlefish oil (ex Nippon Kagaku Shiryo) was added 0.5 kg of calcium hydroxide (ex Hishiko Sekkai Kogyo) and mixed evenly. To the mixture were added 200 g of water containing 5.2 g of LIPASE QLL (ex Meito Sangyo) dispersed therein, and 80 g of caramel (ex Taiyo Yushi), which were then mixed and stirred for 30 minutes at normal temperature, and left standing for 30 hours to react. The resultant reaction product was milled by ordinary methods, yielding about 3.7 kg of a long-chain unsaturated fatty acid calcium salt blend powder.

Reference Example 3

To 5 kg of DHA oil (ex Kanagawa Kagaku Kenkyujo) was added 0.8 kg of calcium hydroxide (ex Hishiko Sekkai Kogyo) and mixed evenly. To the mixture were added 300 g of water containing 8.6 g of LIPASE QLL (ex Meito Sangyo) dispersed therein, and 200 g of caramel (ex Taiyo Yushi), which were then stirred for 30 minutes at normal temperature, and left standing for 30 hours to allow the enzymatic reaction to proceed. The resultant enzymatic reaction product was milled, yielding about 6.1 kg of a long-chain unsaturated fatty acid calcium salt blend powder.

Reference Example 4

10 kg of ARACID (casein ex New Zealand Dairy Board) was dispersed in 80 kg of tap water, and to this solution was added a solution of 0.25 kg sodium hydroxide (ex Tsurumi Soda) dissolved in 9.75 kg of tap water. This mixture was heated for 10 minutes at 90° C. to dissolve the casein and cooled to 55° C. 10 g of PANCREATIN (ex Amano Seiyaku) was added thereto, and was subjected to hydrolysis by the enzyme for 5 hours at 40° C., followed by heating for 10 minutes at 90° C. to deactivate the enzyme. The resultant hydrolyzate liquid was concentrated by ordinary methods and spray dried to give about 8 kg of powdered casein hydrolyzate.

Reference Example 5

10 kg of LACPRODAN DI-8090 (whey protein concentrate ex MD Foods Ingredient) was dissolved in 90 kg of tap water, sterilized by heating at 70° C. for 5 minutes (pH 6.5), and cooled to 50 ° C . 5 g of TRYPSIN PTN6.0S (ex Novo) was added thereto, and was subjected to hydrolysis by the enzyme for 5 hours at 50° C. followed by heating for 10 minutes at 90° C. to deactivate the enzyme. The resultant hydrolyzate liquid was concentrated by ordinary methods and spray dried to give about 9 kg of powdered whey protein hydrolyzate.

Reference Example 6

5 kg of powdered egg white (ex Taiyo Kagaku) was dissolved in 95 kg of tap water, and pH was adjusted to 3.0 by adding hydrochloric acid. 50 g of PEPSIN (ex Amano Seiyaku) was added thereto, and was subjected to hydrolysis by the enzyme for 6 hours at 40° C., followed by heating for 5 minutes at 80° C. to deactivate the enzyme. The insolubles were removed through centrifugal separation, and sodium hydroxide was added to adjust pH to 7.0. The product was concentrated by ordinary methods and spray dried to give about 4 kg of powdered egg white hydrolyzate.

Reference Example 7

5 kg of GELATIN M-2 (ex Nippi Gelatin Kogyo) was dissolved in 95 kg of tap water, heated for 10 minutes at 90° C. to dissolve and sterilize the gelatin, and cooled to 60° C. 25 g of PAPAIN (ex Amano Seiyaku) was added thereto, and was subjected to hydrolysis by the enzyme for 8 hours at 60 ° C., followed by heating for 20 minutes at 95° C. to deactivate the enzyme. The insolubles were removed through filtration through diatomaceous earth, and the product was concentrated by ordinary methods and spray dried to give about 3 kg of powdered gelatin hydrolyzate.

BEST MODE FOR CARRYING OUT THE INVENTION

The invention is described in greater detail below through examples, which however should not be construed as limiting of the invention.

EXAMPLE 1

1) Principal ingredients (unit: g) long-chain unsaturated fatty acid calcium salt blend powder prepared by the method of Reference Example 3

| | |
|---|---|
| 1) Principal ingredients (unit: g) | 430 |
| long-chain unsaturated fatty acid calcium salt blend powder prepared by the method of Reference Example 3 | |
| casein hydrolyzate powder prepared by the method of Reference Example 4 | 1,060 |
| 2) Other ingredients | (unit: g) |
| soybean lecithin (ex Toyotoshi Seiyu) | 85 |
| arginine (ex Tanabe Seiyaku) | 7 |
| cystine (ex Tanabe Seiyaku) | 15 |
| taurine (ex Taiyo Kakgaku) | 24 |
| vitamin E (ex Nippon Roche, containing 50% dry vitamin E) | 1.7 |
| choline chloride (ex Mitsubishi Gas Chemical) | 7 |
| vitamin mixture (ex Korubon Dozu Japan) | 25 |
| mineral mixture (ex Nippon Haigo Shiryo) | 68 |

Fine granular feed was manufactured as follows using the above ingredients. The casein hydrolyzate powder was charged to a mixer equipped with heater (ex Irie Shokai) in which had been placed 3 kg of water, and was heated to 80° C. to dissolve the casein hydrolyzate.

The long-chain unsaturated fatty acid calcium salt blend powder was added to the solution, and the mixture was heated to 90° C., stirred for one hour, and then the remainder of the ingredients were added thereto all at once, followed by stirring for 20 minutes at 90° C.

Next, the mixture was dewatered by reducing pressure in the mixer and stirring for 3 hours at 90° C., and thus obtained solidified mixture was milled and sieved to give about 1.7 kg of fine granular feed for fry.

The resultant fine granular feed for fry had particle size of about 150–250 $\mu$m and water content of 4.6%.

EXAMPLE 2

About 1.5 kg of fine granular feed for fry was prepared by the same method as Example 1, except for using as the principal ingredients 290 g of long-chain unsaturated fatty acid calcium salt blend powder prepared by the method of Reference Example 1 and 1,100 g of hydrolyzed whey protein condensate prepared by the method of Reference Example 5; dissolving the hydrolyzed whey protein condensate in 3.3 kg of water; dissolving the hydrolyzed whey protein condensate at 85° C.; and dewatering the mixture by stirring for 3 hours at 95° C.

The resultant fine granular feed for fry had particle size of about 120–180 $\mu$m and water content of 4.3%.

EXAMPLE 3

About 1.5 kg of fine granular feed for fry was prepared by the same method as Example 1, except for using as the principal ingredients 740 g of long-chain unsaturated fatty acid calcium salt blend powder prepared by the method of Reference Example 2 and 740 kg of hydrolyzed egg white powder prepared by the method of Reference Example 6; dissolving the hydrolyzed egg white powder in 2.1 kg of water; dissolving the hydrolyzed egg white powder at 83° C.; and dewatering the mixture by stirring for 4 hours at 92° C.

The resultant fine granular feed for fry had particle size of about 120–180 $\mu$m and water content of 4.6%.

EXAMPLE 4

About 1.6 kg of fine granular feed for fry was prepared by the same method as Example 1, except for using as the principal ingredients 450 g of long-chain unsaturated fatty acid calcium salt blend powder prepared by the method of Reference Example 3 and 1,040 kg of hydrolyzed gelatin powder prepared by the method of Reference Example 7; dissolving the hydrolyzed gelatin in 3.5 kg of water; dissolving the hydrolyzed gelatin at 80° C.; and dewatering the mixture by stirring for 4 hours at 93° C.

The resultant fine granular feed for fry had particle size of about 180–200 $\mu$m and water content of 4.5%.

Industrial Applicability

The present invention relates to fine granular feeds for fry containing at least two effective ingredients, i.e., a long-chain unsaturated fatty acid calcium salt blend and an animal peptide mixture, and the advantages of the invention are as follows.

1) Survival rate of fry is dramatically increased, improved breeding efficiency and significant economic benefits can be obtained.

2) During feeding, little elution of nitrogen sources from the fine granular feed into seawater or water is caused, therefore, high feeding efficiency can be obtained.

3) The labor, equipment, and outlays associated with feed can be reduced.

What is claimed is:

1. A fine granular feed for a fry of fishes being in the form of fine granules comprising at least the following three ingredients, a), b) and c) as effective ingredients:
   a) a long-chain unsaturated fatty acid calcium salt blend comprising 80% by weight or more of long-chain unsaturated fatty acid calcium salts having at least 18 carbon atoms and (b) 20% by weight or less of a browned matter formed by heating molasses or sugars, a browned matter formed by heating sugars and amino acids, or a mixture thereof in an arbitrary ratio; and
   (c) a mixture of peptides obtained by hydrolyzing animal protein.

2. A fine granular feed for a fry of fishes according to claim 1, wherein said long-chain unsaturated fatty acid calcium salt blend is 80–99.5% by weight of long-chain unsaturated fatty acid calcium salts having at least 18 carbon atoms and 20–0.5% by weight of a browned matter formed by heating molasses or sugars, a browned matter formed by heating sugars and amino acids, or a mixture thereof in an arbitrary ratio.

3. A fine granular feed for a fry of fishes according to claim 1 or 2, wherein said long-chain unsaturated fatty acid calcium salt blend and said peptide mixture are contained in amounts of 20 to 50%, by weight and 80 to 50% by weight, respectively, based on ingredients excluding the other feed ingredients.

* * * * *